Feb. 2, 1926.
J. CALDWELL
SHOCK ABSORBER
Filed July 22, 1925
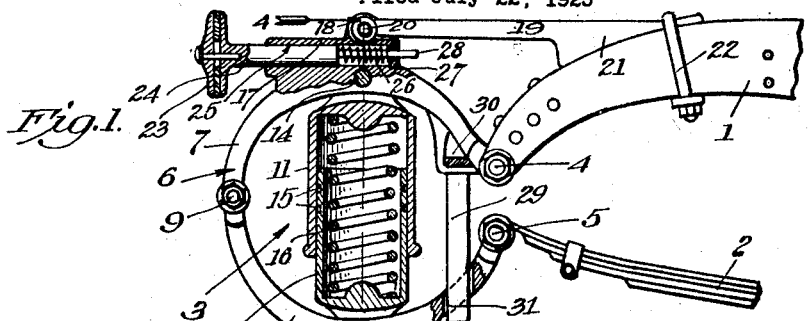
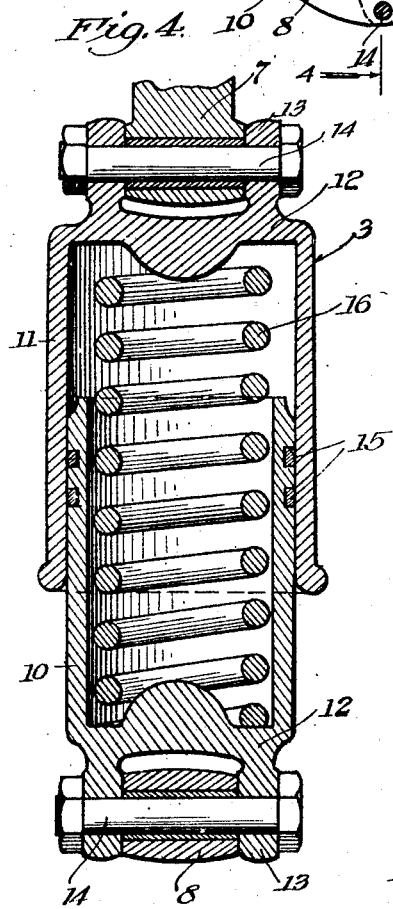
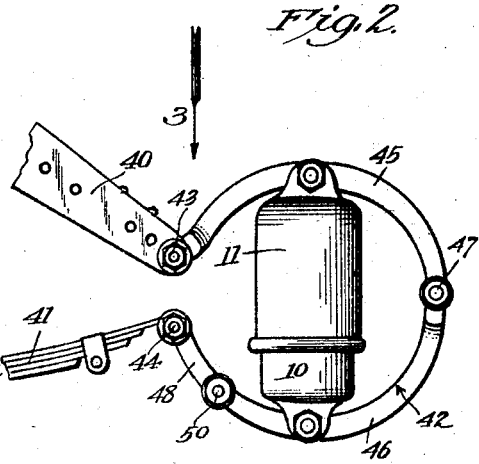
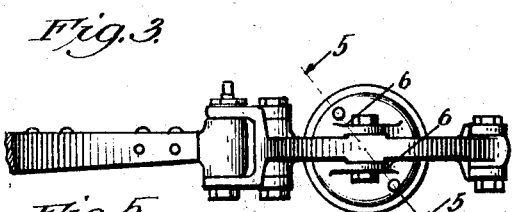
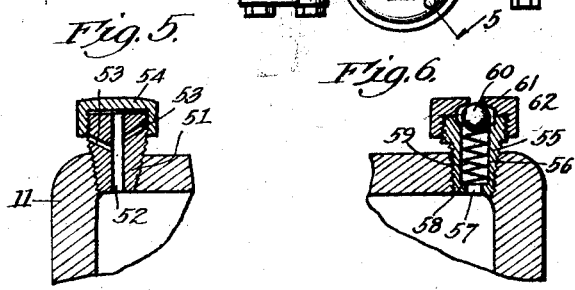
Inventor:
Jack Caldwell.
by Hazard and Miller
Attorneys Patented Feb. 2, 1926.

1,571,393

UNITED STATES PATENT OFFICE.

JACK CALDWELL, OF LOS ANGELES, CALIFORNIA, ASSIGNOR OF ONE-HALF TO ROBERT NELSON FERGUSON, OF PASADENA, CALIFORNIA.

SHOCK ABSORBER.

Application filed July 22, 1925. Serial No. 45,230.

*To all whom it may concern:*

Be it known that I, JACK CALDWELL, a citizen of the United States, residing at Los Angeles, in the county of Los Angeles and State of California, have invented new and useful Improvements in Shock Absorbers, of which the following is a specification.

My invention is a shock absorber for automobiles adapted to be positioned between the frame and the springs to prevent excessive spring action and also to give easy riding over small irregularities of the road.

My shock absorber is secured in a pivoted yoke the opposite arms of the yoke being connected respectively to the frame and to the spring and having my shock absorber spring between the arms of the yoke. More specifically, my invention as applied to the front axle consists of a curved yoke extending forwardly and upwardly from the forward end of the frame and having a hinged lower arm bent substantially in a semi-circle downwardly with its rear end connected to the front end of the spring. I prefer to secure the upper arm rigidly to the frame by a brace extending backwardly from the upper arm and bolted to the frame. This brace may have a bumper resiliently mounted therein.

On the rear spring I prefer to secure the two semi-circular arms of the yoke with their inner ends connected respectively to the end of the frame and the spring and being swivelled together with the addition of a spring shackle connecting the lower arm of the yoke to the spring. My spring mounting between the arms of the yoke comprises a pair of telescoping cylinders with a coil spring situated therein. The lower cylinder forms a cup which is filled with grease and the upper cylinder is provided with a greasing aperture and with an air valve to allow passage of air on the up and down movement of the spring but to prevent spraying of the oil.

My invention will be more readily understood from the following description and drawings, in which;

Figure 1 is a side elevation of my shock absorber as attached to the front of a frame and to the front spring.

Fig. 2 is a side elevation of my shock absorber attached to the rear frame and spring of a vehicle.

Fig. 3 is a plan of the absorber of Fig. 2 in the direction of the arrow 3.

Fig. 4 is a vertical section of Fig. 1 on the line 4—4 in the direction of the arrows, showing the grease cylinders with the compression spring therein and part of the yoke arms.

Fig. 5 is a detailed section on the line 5—5 of Fig. 3.

Fig. 6 is a detailed section on the line 6—6 of Fig. 3.

Referring particularly to Figs. 1 and 4, the front portion of a vehicle frame is indicated by the numeral 1, having the usual type of spring 2 with my shock absorber designated generally by the numeral 3 swivelly connected between the frame and the spring by means of swivel bolts 4 and 5.

The shock absorber yoke is designated by the numeral 6 and comprises an upper arm 7 and a lower arm 8 pivotally connected by the pin 9. These arms are of arcuate shape and each forms substantially a semi-circle. A pair of grease cylinders 10 and 11 are telescopically mounted one in relation to the other and have base portions 12 with lugs 13 on opposite sides so that the grease cylinders may each be secured to the upper and lower arms of the yoke by means of bolts 14. These cylinders form a close sliding fit and in addition preferably have packing rings 15. The inner cylinder 10 contains a coil spring 16 which bears against the bases of the lower and upper cylinders and is sufficiently strong to prevent the ends of the spring and the frame from contacting. The inner cylinder is loaded with grease to lubricate the spring and the wall of the two sliding cylinders.

If desired the upper arm may be held rigid in relation to the frame and in the construction shown in Fig. 1 an integral block 17 extends upwardly from the arm 7 and has lugs 18 at the top to which a brace 19 is connected by a pin 20. The foot of the brace 21 is shaped to conform to the frame and clamped thereto by a shackle 22. With this construction the yoke may be swivelled somewhat up and down and the brace conform to the shape of different frames.

I preferably secure a bumper 23 in the block by a bumper rod 24 which is slidable in a bore 25 and retained in its outward position by a spring 26 bearing against the base 27 of the bore through which extends a reduced stem 28 of the bumper rod.

A rebound strap 29 is threaded through a slot 30 in the upper arm and a slot 31 in the lower arm and may hang loosely so as to stop the upthrow.

The shock absorber for the rear end of the frame is indicated particularly in Figs. 2 and 3 in which the end of the frame is designated by the numeral 40, the spring 41, the yoke by 42 connected by swivel bolts 43 and 44. The yoke is constructed with an upper and a lower arcuate arm 45 and 46 connected by a pin 47. The inner end of the lower arm is connected by a shackle 48 between the swivel bolt 44 and the swivel pin 50 on the end of the arm. In this construction the arms of the yoke are arcuately-shaped, the upper arm being shown as substantially semi-circular, the lower arm with the shackle 48 also forms substantially a semi-circle.

The shock absorber cylinders are substantially the same as shown and described in connection with Figs. 1 and 4 and are therefore designated by the same numerals 10 and 11. In this construction both the upper and the lower arm are free to swivel in regard to the frame and to the spring, thus giving a free acting connection at the rear of the vehicle where most of the passengers are usually seated.

The air check is shown particularly in Fig. 5 and is formed by a plug 51 screw threaded into the top of the cylinder 11 having a passage therethrough 52 with a series of very small lateral passages 53. A cap 54 internally screw threaded may be threaded up and down on the plug to open one or more of the lateral passages 53 to vary the total size of passage through which air may enter and be pressed out of the telescoping cylinders by their action.

The oiling plug for the cylinders is illustrated particularly in Fig. 6 in which a screw threaded plug 55 is secured to the upper end of the cylinder 11 and has a central bore 56 therein with a small aperture 57 at the base forming an oil opening and also a seat 58 for the spring 59 which supports the ball valve 60. The valve seat 61 is formed in a cup 62, screw threaded on the upper end of the plug 55. By this construction oil may be introduced into the cylinders by depressing the ball valve but the spring is of sufficient resistance so that it will not function to allow air to flow in or out through the oil opening.

It is believed the operation of my shock absorbers will be obvious from the above description. The arms of the yokes are maintained separated by the coil springs in the telescoping cylinders and will function under slight irregularities of the road to give an additional resiliency to the main vehicle springs. However, when large bumps are encountered there is material resistance to the compression or elongating of the telescoping cylinders due to either the compression of the air contained therein or the air pressure on the outside resisting the formation of a vacuum by the spreading apart of the arms of the yoke.

I prefer to mount the upper yoke in a substantially rigid position on the front of the frame as shown in Fig. 1 as it is not necessary nor desirable that the engine end of the machine be as resiliently carried as the passenger part of the vehicle. The rear end however, is mounted in a more resilient construction in that the upper and lower arms of the yoke are free to swivel and a shackle is introduced between one of the arms and the spring.

My invention may be materially modified to suit different circumstances and types of vehicles and also be adapted for different forms of springs. Moreover, the various proportions of the arms in relation to the position of the telescopic cylinder may be changed to give a greater or a lesser leverage in acting thereon. Other changes will also be obvious within the scope of my invention.

Having described my invention, what I claim is:

1. A shock absorber having a yoke with pivotally connected arms, means to connect the free ends of the arms to the frame and an element connected to the running gear and means inside the yoke between the arms to resist spreading and contraction of the yoke.

2. A shock absorber comprising in combination a yoke having a pair of pivotally connected arms, a vehicle frame, a connection thereto to one arm, a vehicle spring, a connection thereto to another arm and means positioned in the yoke to attach to each arm to resist compression and expansion of the yoke.

3. A shock absorber as claimed in claim 2, in which the arms are arcuately shaped and with their concaved faces towards each other, the pivotal connection of the arms being on the opposite side of the resistance element from the connection to the frame and the springs.

4. A shock absorber comprising in combination a yoke having pivotally connected arcuate arms, a pair of telescopic cylinders, each swivelly connected to an arm containing a compressible medium and means to attach the free ends of the arms to relatively moving parts of a vehicle.

5. A shock absorber as claimed in claim 4, having in addition an air passage to the telescopic cylinders and means to regulate the size of said passage.

6. A shock absorber as claimed in claim 4, having a valve to introduce oil through one of the cylinders, said valve having a valve member normally pressed against the valve seat to restrict the passage of air through the oil valve to and from the telescopic cylinders.

7. A shock absorber comprising in combination a yoke having a plurality of arcuate arms with their concave faces towards each other, a pivot pin connecting the arms together, a pair of cylinders attached to said arms telescoping one within the other, a compression spring in the cylinders adapted to press against the base of each cylinder and means to attach the free arms to two relatively moving parts of a vehicle.

8. A shock absorber as claimed in claim 7, having in addition a bumper mounted on one of the arms.

9. A shock absorber as claimed in claim 7, having in addition a bumper slidably mounted in one of the arms and a brace from the arm adapted to engage a part of a vehicle.

10. A shock absorber comprising in combination a vehicle frame, a vehicle spring, an arcuate yoke having a pair of pivotally connected arms, the free ends of the arms being attached respectively to the frame and the spring, a resilient element between the two arms of the yoke, a brace connected to one of the arms and attached at its other end to the frame of the vehicle.

11. A shock absorber as claimed in claim 10, having in addition a bumper slidably mounted in the arm having the brace and a resilient element in said arm to take the thrust from the bumper.

In testimony whereof I have signed my name to this specification.

J. CALDWELL.